United States Patent [19]

Abe et al.

[11] Patent Number: 5,032,430
[45] Date of Patent: Jul. 16, 1991

[54] METHOD OF PRODUCING A METAL GASKET

[75] Inventors: Tsunehiko Abe, Kawaguchi; Sadao Watanabe, Ohmiya; Norio Hamba, Urawa, all of Japan

[73] Assignee: Nippon Leakless Industry Co., Ltd., Tokyo, Japan

[21] Appl. No.: 494,319

[22] Filed: Mar. 16, 1990

Related U.S. Application Data

[62] Division of Ser. No. 275,112, Nov. 22, 1988, Pat. No. 4,968,045.

[51] Int. Cl.$^5$ .......................... B05D 3/12; B05D 5/00
[52] U.S. Cl. ..................................... 427/272; 427/273
[58] Field of Search ....................... 427/272, 273, 348; 51/310, 317, 318, 311, 312

[56] References Cited

U.S. PATENT DOCUMENTS 4,133,919  1/1979  Parsons .............................. 427/259
4,510,176  4/1985  Cuthbert et al. ............... 427/240 X Primary Examiner—Evan Lawrence
Attorney, Agent, or Firm—Young & Thompson

[57] ABSTRACT

A method of producing a metal gasket having at least a cooling water opening comprises steps of coating a surface treatment agent on an outer surface of the metal gasket, covering by a masking jig the outer surface of the metal gasket except a region surrounding the cooling water opening, and removing the surface treatment agent in the region by jetting superhigh pressure water at the region.

4 Claims, 4 Drawing Sheets

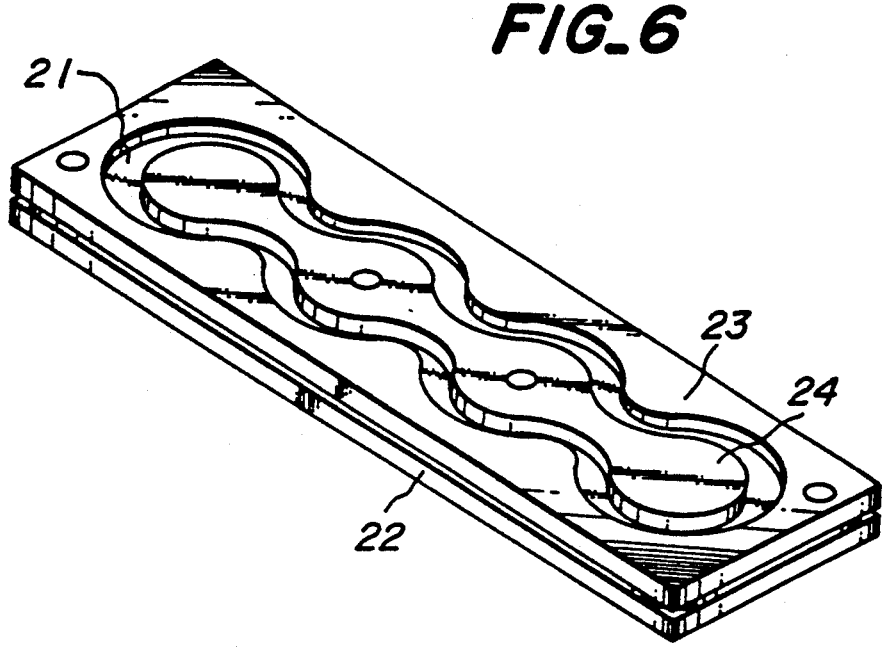
FIG_6
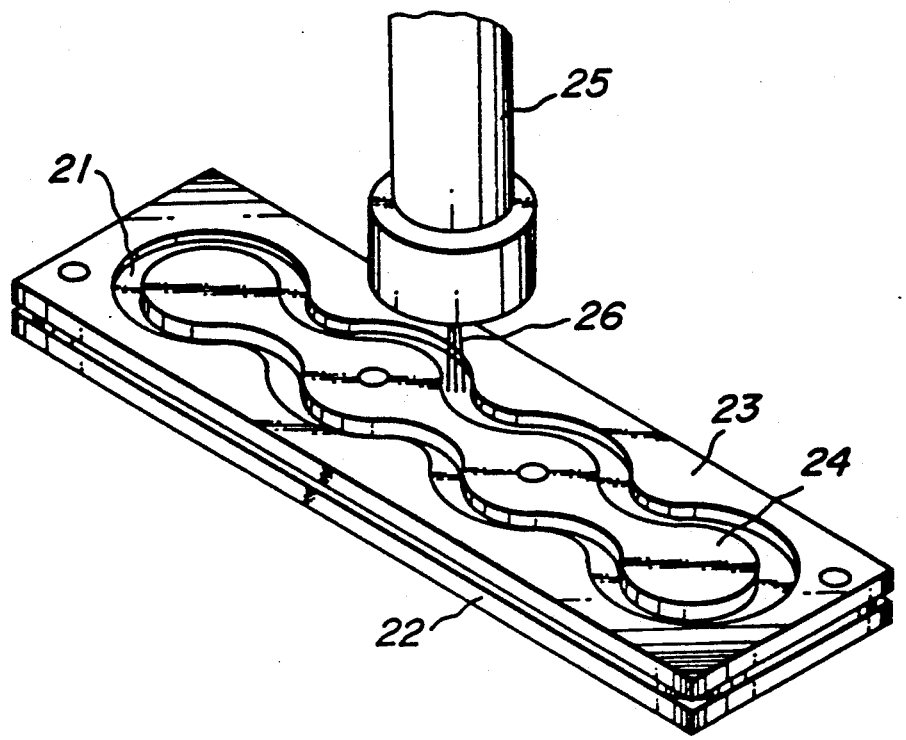
FIG_7

METHOD OF PRODUCING A METAL GASKET

This application is a division, of application Ser. No. 07/275,112, filed Nov. 22, 1988 now U.S. Pat. No. 4,968,045.

BACKGROUND OF THE INVENTION

This invention relates to a metal gasket mainly suitable for use in internal combustion engines for automobiles and a method of producing the metal gasket.

FIG. 1 is a sectional view illustrating the proximity of a cooling water opening of an internal combustion engine using a prior art metal gasket. The metal gasket is clamped between a cylinder head 1 having a cooling water opening 1a and a cylinder 2 having a cooling water opening 2a. The metal gasket comprises a main plate 3 directly contacting the cylinder head 1, a main plate 4 directly contacting the cylinder 2 and a sub-plate 5 interposed between the main plate 3 and 4. Reference numeral 6 denotes a cooling water opening provided in the metal gasket made of the main plates 3 and 4 and the sub-plate 5.

In the prior art, the cooling water openings formed in the plates 3, 4 and 5 are the same in size and completely aligned with each other. Areas of the cooling water openings of the plates 3, 4 and 5 are usually smaller than those of the cooling water openings 1a and 2a of the cylinder head 1 and the cylinder 2. Such smaller areas of the cooling water openings of the gasket plates are set for suitably controlling flow rate of a cooling water flowing therethrough.

With the metal gasket shown in FIG. 1, however, surfaces 3a and 4a of the main plates 3 and 4 about the cooling water opening 6 are exposed to the cooling water in the cooling water openings 1a and 2a. Therefore, the exposed portions of the gasket are likely to be damaged in use for a long period of time.

In more detail, as the upper surface of the main plate 3 and the lower surface of the main plate 4 are directly contacted with the cylinder head 1 and the cylinder 2, the contacted surfaces of the gasket are frequently coated with various kinds of sealing agents including rubber or fluorine in order to improve sealing faculty. In this case, when the gasket has been used for long time, the coating layers of the sealing agents are peeled and circulated together with the cooling water. As a result, the peeled agents are sometimes attached to thermostats and radiators to causing engine troubles such as overheating.

SUMMARY OF THE INVENTION

It is a primary object of the invention to provide an improved metal gasket for an internal combustion engine and a method of producing the metal gasket, which eliminates all the disadvantages of the prior art and prevents a surface treatment agent from peeling from the gasket, thereby preventing any engine trouble caused by the peeled agent.

In order to achieve the object, in the metal gasket for an internal combustion engine having at least a cylinder opening and a cooling water opening and coated on its outer surface with a surface treatment agent, according to the invention the surface treatment agent in a region of the metal gasket surrounding said cooling water opening has been removed.

A method of producing a metal gasket having at least a cooling water opening according to the invention comprises steps of coating a surface treatment agent on an outer surface of the metal gasket, covering by a masking jig the outer surface of the metal gasket except a region surrounding said cooling wear opening, and removing a surface treatment agent in the region by jetting superhigh pressure water at the region.

As above described, according to the invention the coating layer of the surface treatment agent in the region surrounding the cooling water openings of the metal gasket is removed by jetting superhigh pressure water against the region so that the surface treatment agent on the main plates on the sides of the cylinder head and the cylinder is not exposed to the cooling water openings. Therefore, the layer of the surface treatment agent is prevented from peeling from the gasket so that there is no risk of the peeled agent being circulated to cause engine troubles.

The invention will be more fully understood by referring to the following detailed specification and claims taken in connection with the appended drawings.

BRIEF DESCRIPTION OF THE DRAWINGS

FIG. 6 is a perspective view of the assembled masking jig; and

FIG. 7 is a perspective view illustrating the masking jig and part of a superhigh pressure water injection device.

DESCRIPTION OF THE PREFERRED EMBODIMENT

Figure 1:
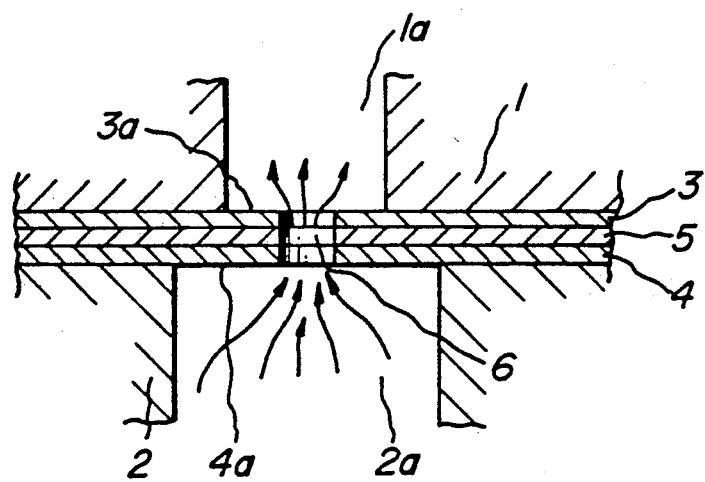
FIG. 1 is a partial sectional view of a gasket of the prior art in a used condition.
Figure 2:
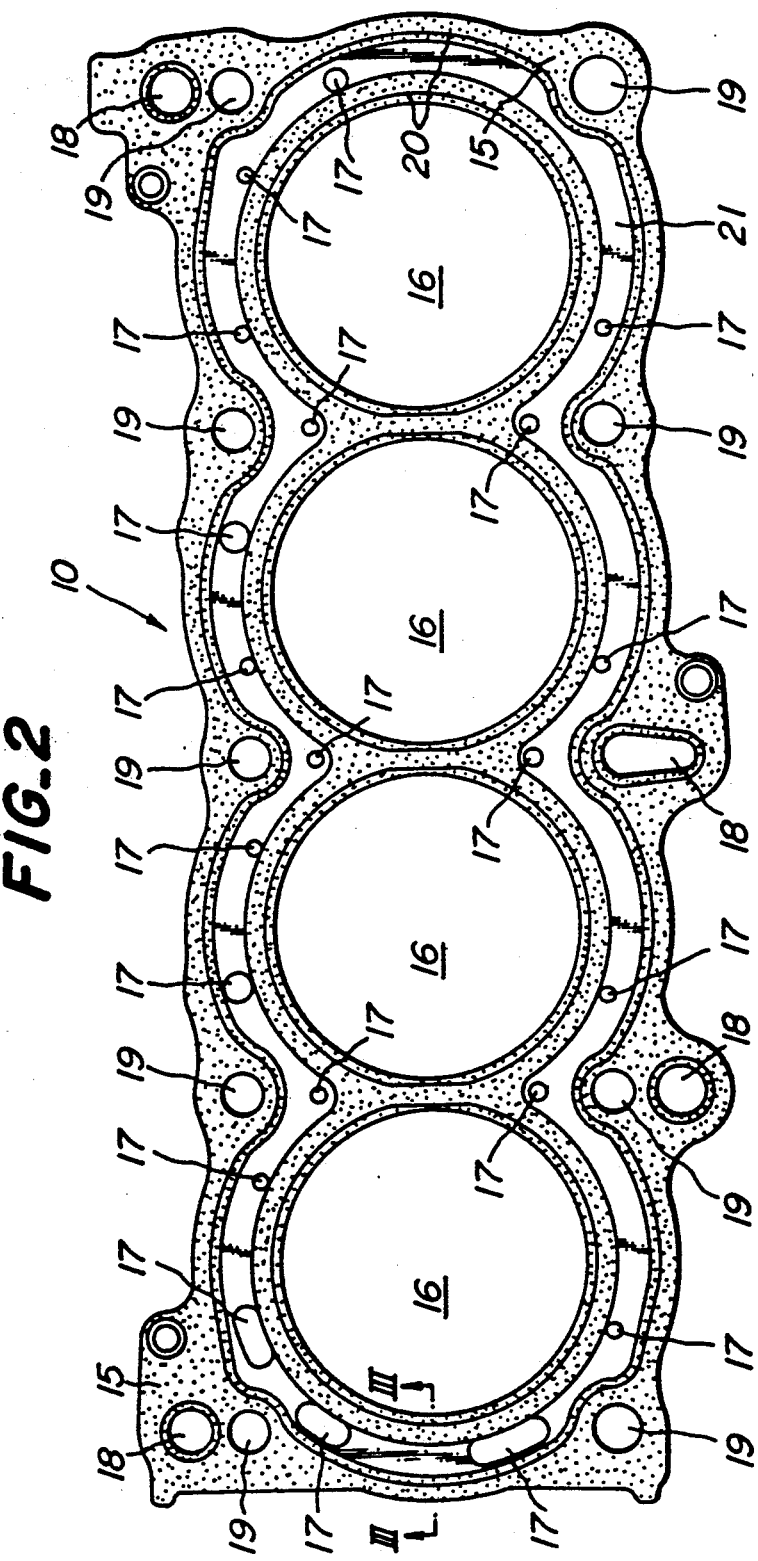
FIG. 2 is a plan view of a metal gasket according to the invention.
Figure 4:
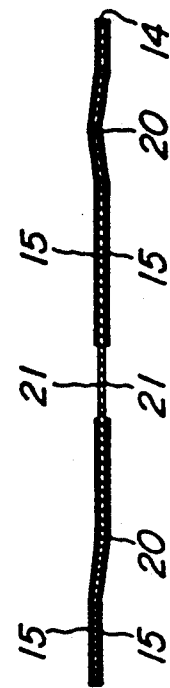
FIG. 4 is an enlarged sectional view similar to FIG. 3 but showing a metal gasket of a single-layer type.
Figure 3:
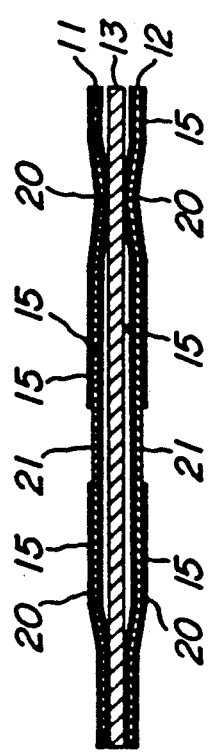
FIG. 3 is an enlarged sectional view of the metal gasket of a multi-layer type taken along the line III—III in FIG. 2.

FIG. 2 illustrates one embodiment of the gasket 10 according to the invention. FIGS. 3 and 4 are enlarged sectional views of different gaskets taken along the line III—III in FIG. 2, respectively.

The gasket shown in FIG. 3 is a three plate metal gasket comprising two main plates 11 and 12 and one sub-plate 13 sandwiched between the main plates 11 and 12. The gasket shown in FIG. 4 is a metal gasket comprising one main plate.

Each of the main plates 11, 12 and 14 is made of, for example, stainless steel and coated on its both surfaces with a surface treatment agent which is effective for improving sealing property. Reference numeral 15 denotes the surface treatment agent or coating layer. The surface treatment agent may be a material including rubber or synthetic resin or a mixture of them.

As shown in FIG. 2, the gasket 10 is formed with cylinder openings 16, cooling water openings 17, lubricant openings 18, bolt apertures 19 and a bead line 20.

Reference numeral 21 denotes an endless region formed about the respective cylinder openings 16 in a manner surrounding the cooling water openings 17.

In this embodiment, the main plates 11 and 12 (or 14) and the sub-plate 13 are punched to a desired shape as shown in FIG. 2. Thereafter, one of the surfaces of the main plates 11 and 12 which are outer surfaces of the gasket (FIG. 3) or both surfaces of the main plate 14 (FIG. 4) are worked or treated as follows.

Figure 5:
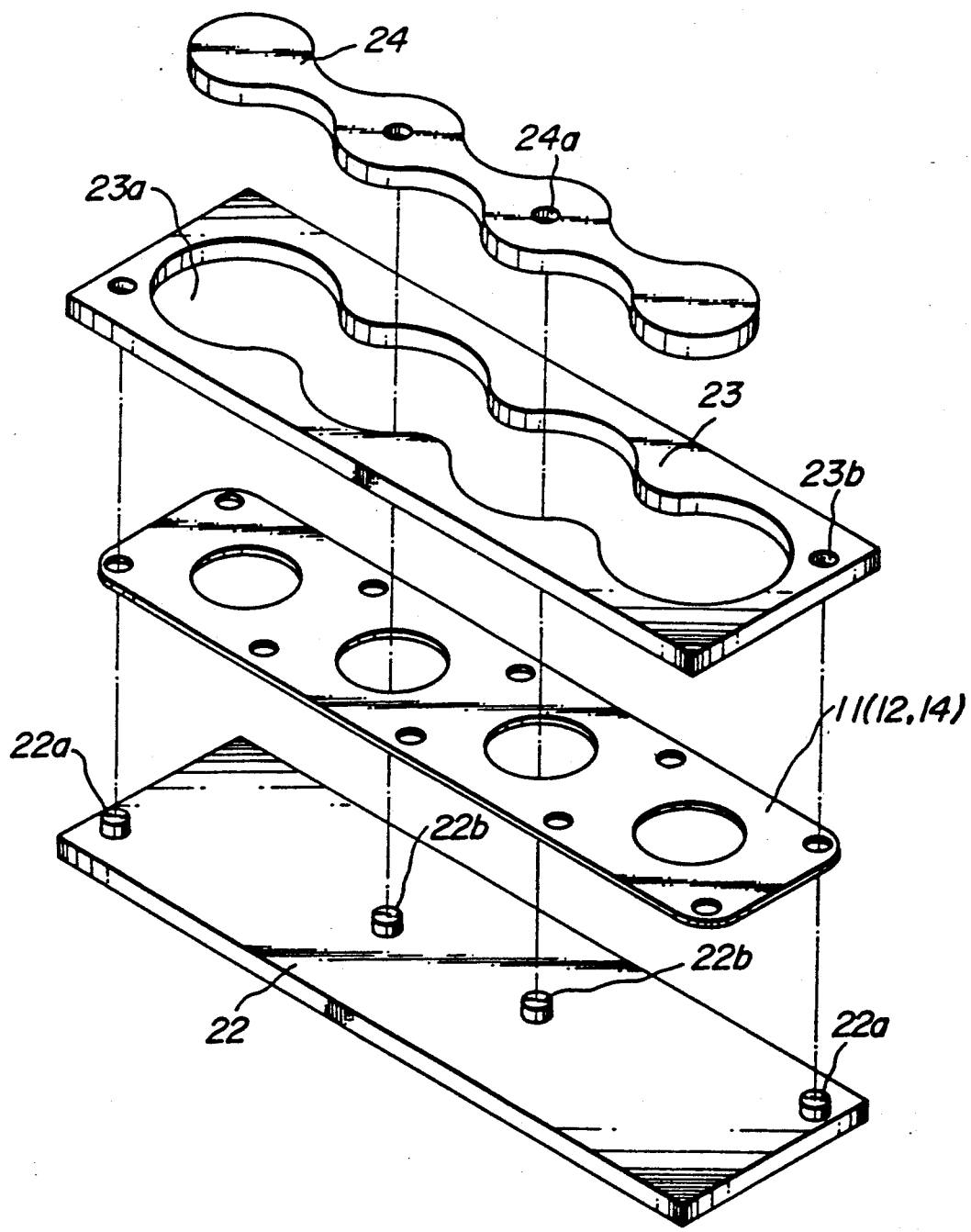
FIG. 5 is an exploded perspective view of a masking jig used for the method according to the invention.

As shown in FIGS. 5-6, a masking jig is prepared which comprises a base plate 22 formed on its upper surface with a plurality of guide pins 22a and 22b.

The masking jig further comprises an outer mask plate 23 formed with a cut out portion 23a to cover the region 21 and guide apertures 23b adapted to be fitted with the guide pins 22a for covering the surface of the gasket outside the region 21 including the cooling water openings 17, and an inner mask plate 24 formed with guide apertures 24a adapted to be fitted with the guide pins 22b for covering the surface of the gasket inside the region 21.

Using the masking jig, the main plate 11 (12, 14) is arranged on the base plate 22 with the aid of the guide pins 22a. On the gasket the outer and inner mask plates 23 and 24 are correctly positioned as shown in FIG. 6. Superhigh pressure jet water 26 is jetted by a superhigh pressure water injection device shown in FIG. 7 into a groove between the outer and inner mask plates 23 and 24 of the piled members of the jig to remove the surface treatment agent (coating layer) 15 in the region 21.

The main plate 11 (12, 14) whose surface treatment agent 15 on the region 21 has been removed is worked to form the bead line 20 at the desired position. Thereafter, in the case of the multi-layer gasket as shown in FIG. 3, the main plates and the sub-plate are assembled to form a gasket such that the surfaces of the main plates from which the surface treatment agents have been removed are arranged on the outer sides. On the other hand, in case of the single plate gasket as shown in FIG. 4, the surface treatment agents on the regions 21 of both surfaces are removed to form a gasket.

Moreover, the step for forming the bead line above described may be carried out before the step for removing the surface treatment agent 15 on the region 21.

One example of the condition for removing the surface treatment agent is as follows.

Opening diameter of superhigh pressure water injection nozzle: 0.2 mm.

Distance between tip end of nozzle and the member to be worked: 40 mm

Used pressure: 1,000-2,000 kgf cm$^2$

Moving speed of nozzle: 1,000-1,500 mm/min

In the agent removing process, the masking jig may be fixed, while the nozzle is moved, and in an opposite way the nozzle may be fixed, while the masking jig is moved.

As can be seen from the above explanation, as the coating layer of the surface treatment agent 15 in the region 21 including the cooling water openings 17 of the metal gasket is removed by the jet of the superhigh pressure water 26 according to the invention, the main plates with coated layers on the sides of the cylinder head and the cylinder are not exposed in the cooling water openings as in the prior art.

According to the invention, therefore, there is no longer any risk of the surface treatment agent coated on the main plates being stripped and circulated together with the cooling water to cause engine trouble.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A method of producing a metal gasket having at least one cooling water opening comprising the steps of coating a surface treatment agent on an outer surface of a metal gasket having said at least one opening, covering by a masking jig the outer surface of the metal gasket except a region surrounding said cooling water opening, and removing the surface treatment agent in the region by jetting superhigh pressure water at the region.

2. A method as set forth in claim 1, wherein in the step of covering the region of the metal gasket a masking jig is used which comprises a base plate formed on its outer surface with a plurality of guide pins, an outer mask plate for covering the outer surface of the metal gasket outside the region, said mask plate being formed with a cut-out portion for positioning over the region and the portion of the outer surface of the metal gasket inside the region, and guide apertures to be fitted with said guide pins, and an inner mask plate formed with guide apertures to be fitted with said guide pins for covering the outer surface of the metal gasket inside said region, said plate fitting within said cutout portion.

3. A method as set forth in claim 1, wherein the pressure of the superhigh pressure water is 1,000-2,000 kgf/cm$^2$.

4. A method of producing a metal gasket having at least one cooling water opening, comprising the steps of coating the surface treatment agent on an outer surface of the metal gasket having said at least one opening, and removing a portion of said surface treatment agent in a region surrounding a said cooling water opening by jetting superhigh pressure water at said region.

* * * * *